Sept. 15, 1931.   F. A. SPENCER   1,823,007

BUMPER

Filed March 19, 1931

INVENTOR
FREDERICK A. SPENCER
BY Townsend & Decker
ATTORNEYS.

Patented Sept. 15, 1931

1,823,007

UNITED STATES PATENT OFFICE

FREDERICK A. SPENCER, OF NEW YORK, N. Y.

BUMPER

Application filed March 19, 1931. Serial No. 523,694.

This invention relates to bumpers for vehicles and has for its principal object the production of a bumper of simple construction and made as to have associated therewith or fastened thereto a license plate so positioned as to be immune from injury should the bumper strike an object or be struck by one.

A further object of the invention is the production of a bumper having the above characteristics which shall be provided with illuminating means adjacent the license plate so that it may readily be seen at night and positioned so as to be protected from injury.

Still a further object of the invention is the production of a bumper having a plurality of bumping portions so that one part only will not be subjected to all the strain in the event of collision.

Other and further objects and advantages of the invention will appear from the following description taken in connection with the accompanying drawings in which.

Figure 1:
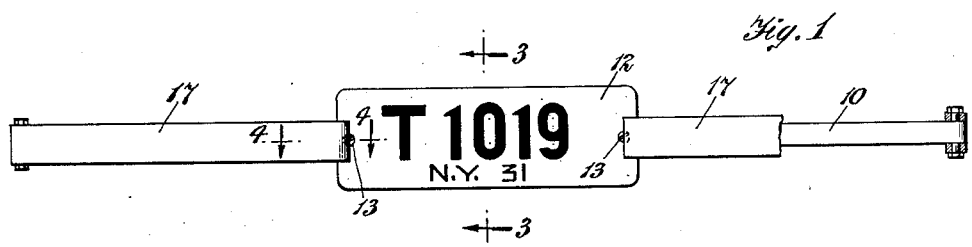
Fig. 1 is a front elevation of the bumper constructed in accordance with my invention.
Figure 2:
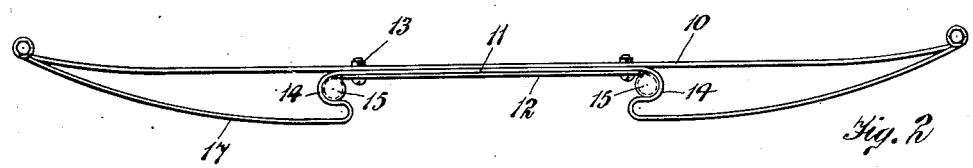
Fig. 2 is a plan view thereof.
Figure 4:
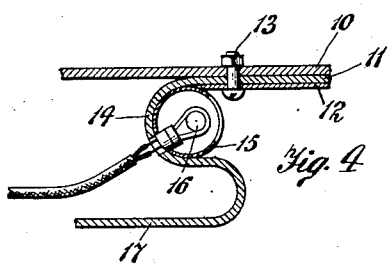
Fig. 4 is a horizontal section on the line 4—4 of Fig. 2.
Figure 3:
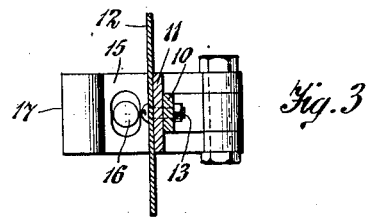
Fig. 3 is a vertical cross-section on the line 4—4 of Fig. 2.

Referring in detail to the several figures of the drawings:

The rear strip or plate of the bumper is indicated at 10 and it may be bolted or otherwise attached to a vehicle in any desirable manner. 11 indicates a flat strip or plate of the forward element of the bumper which lies against the rear strip 10 and to which is bolted the license plate 12 as for instance, by the bolts 13, said bolts also passing through the rear strip 10 to produce a rigid structure. The plate 11 is bent around inwardly at its ends to form lamp reflector receiving portions 14, the lamp reflectors being shown at 15. These reflectors are suitably mounted in the portions 14 and each receives an electric lamp 16 connected with a source of current supply. The ends of the reflector receiving portions 14 are then bent around in the manner shown to form two arcuate-shaped bumper portions 17, the ends of which are pivotally bolted or otherwise secured to the ends of the rear strip or plate 10.

From the above description it will be apparent that in the event of a collision the license plate and the illuminating means will be immune from injury as they lie intermediate the bumper portions 17 and in a plane to the rear thereof. The license plate is also at all times discernible as the light rays from the lamps 16 are thrown thereon by the reflectors 15.

Figure 5:
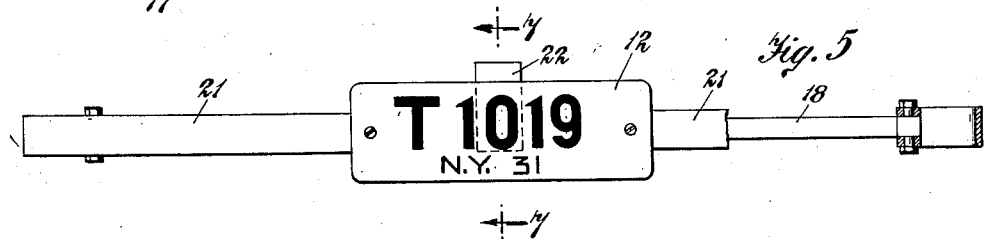
Fig. 5 is a front elevation of a modification.
Figure 6:
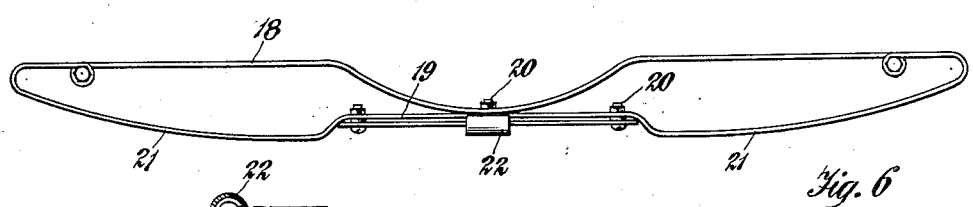
Fig. 6 is a top plan view thereof.
Figure 7:
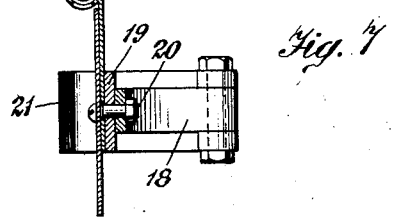
Fig. 7 is a vertical cross-section on the line 7—7 of Fig. 5.

In the modification illustrated in Figs. 5 to 7 inclusive, the configuration of the rear strip or plate 18 is slightly different from that of the preferred form of the invention. The flat strip or plate of the forward element of the bumper is indicated at 19 and the license plate is fastened thereto by the bolts 20, the center one of which also passes through the rear strip or plate 18. In this case the reflector receiving portions 14 of the preferred form of the invention are dispensed with and the ends of the flat strip 19 are bent around in the manner shown to form the bumper portions 21. A lamp reflector 22 is mounted on the top of the strip 19 in any manner, the light rays being reflected downwardly on the license plate instead of from the sides as in the preferred form of the invention. As in the previous case it will be apparent that in the event of a collision the license plate and illuminating means will be immune from injury as they are positioned intermediate the bumper portions 21 and in a plane to the rear thereof.

What I claim is:

1. A bumper having a rear plate and a front plate fastened thereto and provided with a plurality of arcuate-shaped bumper portions and with illuminating means receiving portions and a license plate fastened to said front plate intermediate said illuminating means receiving portions and in a plane to the rear of said bumper portions.

2. A bumper having a rear plate and a front plate fastened thereto and provided with a plurality of bumper portions, a license plate fastened to said front plate intermediate two of said bumper portions, a reflector fastened to said front plate over said license plate and illuminating means within said reflector.

Signed at New York, in the county of New York, and State of New York this 18th day of March, A. D. 1931.

FREDERICK A. SPENCER.